March 5, 1929.  G. H. FLETCHER  1,704,243
ELECTRIC TRACTION
Filed Nov. 12, 1923
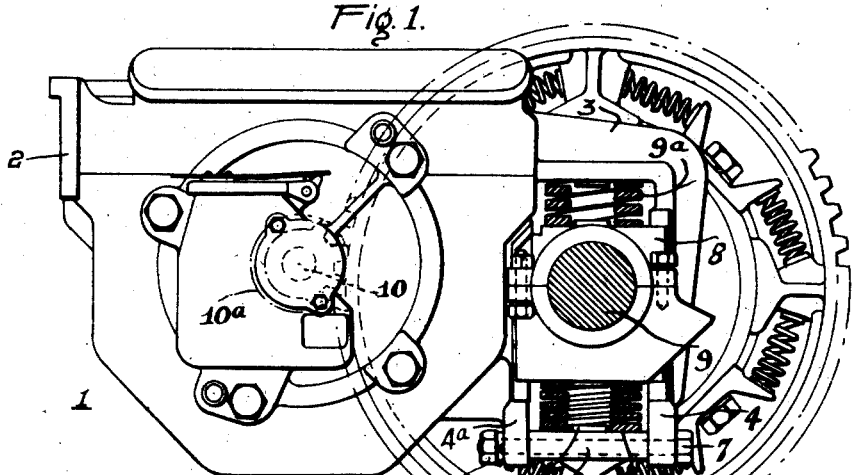
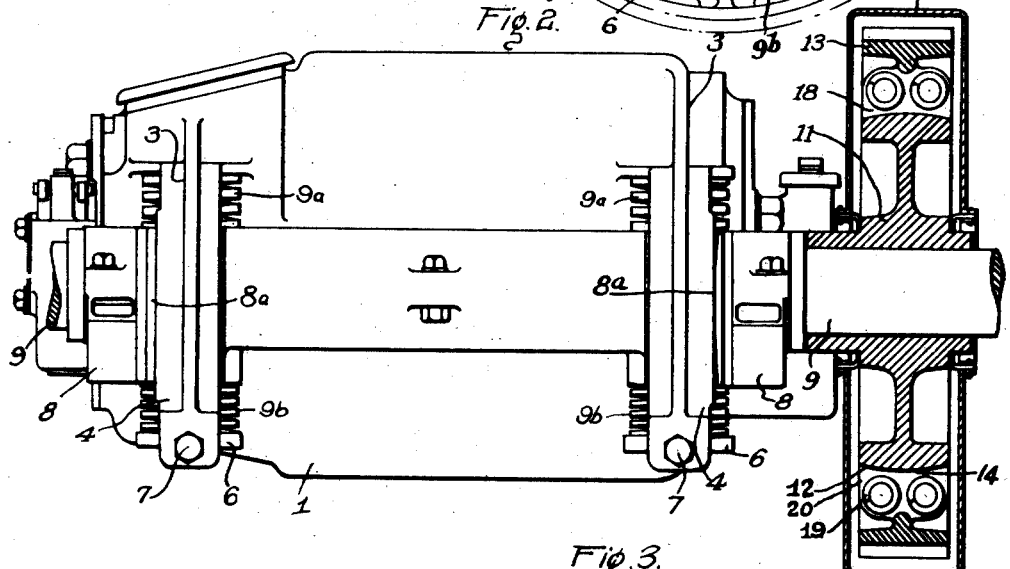
WITNESSES:
INVENTOR
George Herbert Fletcher.
BY
ATTORNEY Patented Mar. 5, 1929.

1,704,243

UNITED STATES PATENT OFFICE.

GEORGE HERBERT FLETCHER, OF SHEFFIELD, ENGLAND, ASSIGNOR TO WESTINGHOUSE ELECTRIC & MANUFACTURING COMPANY, A CORPORATION OF PENNSYLVANIA.

ELECTRIC TRACTION.

Application filed November 12, 1923, Serial No. 674,223, and in Great Britain November 14, 1922.

This invention relates to improvements in electric traction and more especially to the suspension of traction motors upon the trucks of electric locomotives, street railway, and other electrically propelled vehicles.

Heretofore, it has been the usual practice to bolt the yoke of a traction motor at one side thereof to a transom or suspension bar that is resiliently carried by the truck, while the other side of the motor is suspended directly upon the truck axle. With such an arrangement, although one side of the motor is spring borne, approximately half of the total weight thereof may be regarded as a dead weight upon the axle. Furthermore, the whole inertia of the motor is associated with the axle and this has a deleterious effect upon the motor, the truck and even upon the track rails.

According to the present invention, the side of the motor that is remote from the truck axle is or may be resiliently suspended as usual in any convenient manner, and the motor at the other side is resiliently supended upon the truck axle or upon the axle bearing. This result may be effected by the provision at each end of the motor of a rectangular framework attached to the motor yoke and surrounding the truck axle, and by interposing springs between the axle bearings and the upper and lower sides of said frameworks. The frameworks may also constitute vertical guides for the axle bearings. In this manner, the motor is spring borne upon the axle and will permit relative movement of the latter in a vertical direction. Such relative movement is tangential to a circle having its centre in the motor axis, but the extent of movement will not be sufficient to alter appreciably the distance between the gear centres and is, in fact, negligible. Since the axle is resiliently connected with the motor at both ends thereof it will be possible for angular displacement of the truck axle relative to the axle of the motor to take place. In order to obtain correct meshing of the driving gear wheels under such conditions, one of the wheels of the driving gear train may be mounted for universal or spherical movement in relation to its shaft. For example, the driven gear wheel may be spherically seated upon a hub attached to the truck axle.

According to a convenient construction of said spherically seated gear wheel, a spherically-curved periphery or seat is turned on the hub portion, which is attached to the car axle, while a separate toothed rim or annulus is turned with a spherically-curved internal surface and arranged to seat on the spherically-curved periphery of the hub portion. The toothed rim or annulus is in this manner permitted to take up such a position that the teeth of the gear wheel are parallel to the teeth of the driving pinion, even when the truck axle is not parallel to the axle of the motor. Alternatively, the driving pinion may be spherically seated.

Furthermore, a resilient drive may be provided between the said hub portion and the said toothed rim or annulus of the gear wheel. For this purpose the hub portion may be provided with substantially radial projections, while the spherically-curved portion of the toothed rim or annulus is formed with gaps into which the said radial projections on the hub portion freely project, compression springs being inserted between said projections and suitable abutments on the toothed rim or annulus.

In order that the invention may be clearly understood and readily carried into practice, reference will now be made to the accompanying drawings, wherein a constructional form thereof is illustrated by way of example.

Fig. 1 is a view in end elevation showing the arrangement of resilient suspension of the motor upon the truck axle;

Fig. 2 is a view in side elevation thereof also showing the spherically seated gear wheel, in section, mounted on the car axle, and Fig. 3 is a detail view of part of said gear wheel.

Referring to Figs. 1 and 2 of the drawings, the motor 1 is shown as having a seat 2 provided at one side thereof whereby it may be suspended in any convenient manner upon a car or truck (not shown), such as by bolting the seat to a transom or suspension bar that is resiliently carried by the truck of the locomotive or car. The motor at its other side is provided with two projecting brackets 3, each having depending guide arms 4 and 4ᵃ through which is passed a spindle 5, which carries a supporting plate 6, intermediate the depending guide arms, and which is held in position at its ends externally of the arms by nuts 7. Slidably interposed between each pair of the arms 4 and 4ᵃ are split bearings 8 embracing the axle shaft 9 of the car and having slide faces 8ᵃ. Helical compression springs 9ᵃ are provided intermediate the upper faces of the bearings 8 and the undersides of the upper portions of the brackets 3, similar springs 9ᵇ being employed between the undersides of the bearings 8 and the plates 6, whereby the car axle side of the motor is resiliently suspended upon said axle, which, it will be understood, is substantially parallel to the axis of the motor shaft.

Referring to Figs. 2 and 3 of the drawings, a spherically seated gear wheel, which is adapted to engage a driving pinion 10ᵃ on the motor shaft 10, is provided on the car axle 9 and comprises a hub portion 11 that is rigidly mounted on said axle. The hub portion 11 has a spherically-curved periphery or seat 12 upon which a toothed rim portion 13 is seated. The rim portion 13 has a spherically curved internal surface 14 that is complementary to the periphery 12 of the hub portion 11. Radial projections 15 are secured to the periphery 12 of the hub portion of the gear wheel by bolts 16 and nuts 17, the rim portion 13 having formed internally thereof gaps 18 into which the projections 15 freely project. Compression springs 19 are interposed between said projections 15 and abutments 20 on the rim portion.

A casing 21 is shown in Fig. 2 enclosing the gear train.

From the above description it will be understood that by reason of the motor being resiliently suspended upon the car axle, relative movement of the latter in a vertical direction is permitted. Such relative movement being tangential to a circle having its centre in the motor axis, will in practice vary the distance between the gear centres to a negligible extent only. Correct meshing of the gears when relative angular displacement takes place between the motor shaft 10 and the axle 9 is maintained by the provision of the spherically seated gear wheel, which permits the teeth of the gear wheel to remain parallel to the teeth of the driving pinion on the motor shaft, notwithstanding relative angular movement of said shaft and axle.

It will be understood that the driving pinion may be spherically seated in place of or in addition to the gear wheel on the car axle, and that various modifications in detail may be made in the construction all of which fall within the scope of the invention.

I claim as my invention:—

1. The combination with a motor shaft and a wheel axle, of a connecting gear train therefor comprising a tangentially flexible spherically seated gear-wheel and a solid gear-wheel.

2. A railway vehicle drive mechanism comprising a motor associated with a wheel axle and a gear train connecting the motor shaft and said axle, one of the gear-wheels of said train comprising a hub portion having a spherically-curved seat at its outer periphery and a toothed rim portion having a complementary spherically-curved inner surface mounted on said hub, said spherically-curved members being in resilient engagement with each other.

3. A railway vehicle drive mechanism comprising a motor associated with a wheel axle, means for resiliently supporting said motor on said axle and a gear train for operatively connecting the motor to said wheel axle, said gear train embodying a resilient spherically seated gear-wheel.

4. A railway vehicle drive mechanism comprising a motor associated with a wheel axle and a gear train connecting the motor shaft and said axle, one of the wheels of said gear train being mounted for tangentially flexible spherical movement relative to its shaft.

5. A railway vehicle drive mechanism comprising a motor associated with a wheel axle, resilient supporting means for said motor, and a gear train for operatively connecting the motor to said wheel axle; one gear-wheel of said train comprising a hub member and a rim member having spherical engaging faces and resilient means for transmitting torque therebetween.

6. In a suspension system for a driving motor, an electrically propelled vehicle, a truck axle, means for resiliently suspending one side of the motor from the truck axle, a connecting gear train for the motor and the truck axle, said gear train including a gear wheel comprising a hub portion secured to the axle and having a spherical bearing surface at its periphery, a toothed rim portion having a complemental spherical inner bearing surface mounted on said hub portion and resilient engaging means between said hub and rim portions.

7. A railway drive mechanism comprising a driving motor, a driven wheel axle and a gear train for transmitting power from the motor to the wheel axle, said gear train comprising a solid gear-wheel and a spherically seated flexible gear-wheel.

8. A railway vehicle drive mechanism comprising a driving motor, a driven wheel axle and a gear train for transmitting power from the motor to the axle, one of the gear-wheels of said train comprising a hub member and a rim member having spherical engaging faces and a tangentially flexible connection between said members.

9. In a railway vehicle drive, in combination, a driven axle, a motor for driving the axle, a pinion on the motor and a cooperating gear-wheel on the axle, said gear-wheel comprising a hub member and a rim member having spherical engaging faces and resilient means for transmitting torque from the rim member to the hub member.

10. In a railway vehicle drive, in combination, a wheel axle, a motor for driving the wheel axle and a spherically seated flexible gear-wheel disposed to transmit power from the motor to the wheel axle.

In testimony whereof, I have hereunto subscribed my name this 22nd day of October, 1923.

GEORGE HERBERT FLETCHER.